(12) United States Patent
Wilson

(10) Patent No.: US 6,839,739 B2
(45) Date of Patent: *Jan. 4, 2005

(54) COMPUTER ARCHITECTURE WITH CACHING OF HISTORY COUNTERS FOR DYNAMIC PAGE PLACEMENT

(75) Inventor: Kenneth Mark Wilson, San Bruno, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 948 days.

(21) Appl. No.: 09/246,479

(22) Filed: Feb. 9, 1999

(65) Prior Publication Data

US 2002/0049824 A1 Apr. 25, 2002

(51) Int. Cl.[7] ............................................. G06F 15/167
(52) U.S. Cl. ........................ 709/213; 709/214; 711/148
(58) Field of Search ................................. 709/213, 214, 709/215; 711/118–122, 100, 170, 147–148

(56) References Cited

U.S. PATENT DOCUMENTS

| | | | | |
|---|---|---|---|---|
| 5,297,265 A | * | 3/1994 | Frank et al. | 711/202 |
| 5,727,150 A | * | 3/1998 | Laudon et al. | 709/215 |
| 5,734,922 A | * | 3/1998 | Hagersten et al. | 712/37 |
| 5,784,697 A | * | 7/1998 | Funk et al. | 711/170 |
| 5,893,144 A | * | 4/1999 | Wood et al. | 711/122 |
| 5,918,249 A | * | 6/1999 | Cox et al. | 711/203 |
| 5,974,536 A | * | 10/1999 | Richardson | 711/100 |
| 6,035,378 A | * | 3/2000 | James | 709/214 |
| 6,167,437 A | * | 12/2000 | Stevens et al. | 709/214 |
| 6,332,178 B1 | * | 12/2001 | Dean et al. | 711/118 |

* cited by examiner

*Primary Examiner*—Bharat Barot
*Assistant Examiner*—Philip B. Tran

(57) ABSTRACT

A multi-processor system using distributed memory is provided with a cache of history counters located within each memory controller. Each entry of the cache of history counters represents one page in memory that has the potential to increase system performance by migrating or replicating to other memory locations. The cache of history counters permits creating histories of local memory accesses by remote processors for purposes of dynamic page placement.

22 Claims, 3 Drawing Sheets

COMPUTER ARCHITECTURE WITH CACHING OF HISTORY COUNTERS FOR DYNAMIC PAGE PLACEMENT

CROSS-REFERENCE TO RELATED APPLICATION

The present application contains subject matter related to a concurrently filed U.S. patent application Ser. No. 09/246,490 by Kenneth M. Wilson entitled "COMPUTER ARCHITECTURE WITH DYNAMIC SUB-PAGE PLACEMENT". The related application is assigned to the same assignee as the present application.

TECHNICAL FIELD

The present invention relates generally to high performance parallel computer systems and more particularly to dynamic page placement in non-uniform memory architecture systems.

BACKGROUND ART

Many high performance parallel computer systems are built as a number of nodes interconnected by a general interconnection network (e.g., crossbar and hypercube), where each node contains a subset of the processors and memory in the system. While the memory in the system is distributed, several of these systems (called NUMA systems for Non-Uniform Memory Architecture) support a shared memory abstraction where all the memory in the system appears as a large memory common to all processors in the system.

These systems have to address the problem of where to place physical pages within the distributed memory system since the local memory is close to each processor. Any memory that is not local to the processor is considered remote memory. Remote memory has a longer access time than local memory, and different remote memories may have different access times. With multiple processors sharing memory pages and a finite size memory local to each processor, some percentage of the physical pages required by each processor will be located within remote physical memory. The chances that a physical page required by a processor is in local memory can be improved by using static page placement of physical memory pages.

Static page placement attempts to locate each physical memory page in the memory that causes the highest percentage of memory accesses to be local. Optimal physical memory page placement reduces the average memory access time and reduces the bandwidth consumed inside of the processor interconnect between processor nodes where there is uniform memory access (UMA) time. The static page placement schemes include Don't Care, Single Node, Line Interleaved, Round Robin, First Touch, Optimal, etc., which are well known to those skilled in the art.

Dynamic page placement may be used after the initial static page placement to replicate or migrate the memory page to correct the initial placement or change the location due to changes in the particular application's access patterns to the memory page. The multi-processor's operating system may be involved in the decision and copying/movement of the physical page.

A replication is the copying of a physical page so that two or more processors have a local copy of the page. As long as the memory accesses are reads, multiple copies of data can be allowed without causing coherence difficulties. As soon as a write to the page is sent to the memory system, either all but one copy of the page must be removed or an update coherence algorithm must be in place to make sure all of the pages have the same data.

A page migration is the movement of a physical memory page to a new location. The migration is usually permanent and does not require special handling as is required for writes to replicated pages.

An approach to dynamic page placement is described in the paper by Ben Verghese, Scott Devine, Anoop Gupta, and Mendel Rosenblum, "Operating System Support for Improving Data Locality on CC-NUMA Compute Servers", In ASPLOS VII, Cambridge, Mass., 1996.

To track the changes in the application's access patterns to the memory page, histories need to be maintained for every page in memory. A set of counters is located close to the memory system for every physical page in memory and one counter is required for every UMA cell in the multiprocessor system. Whenever a memory access is generated from a processor within a UMA cell, the counter representing the page and the UMA cell generating the memory access is incremented.

There are two main locations for the counters, either within the memory itself or located in a separate hardware structure, such as the memory controller or the directory controller. Placing the counters within the memory has the advantage of keeping the cost down by using the existing DRAM in memory and the number of counters are automatically scaled with the installation of more memory. Unfortunately, this placement has the disadvantage of halving the memory bandwidth because of the accessing and updating of the counters. Placing the counters outside of memory adds a significant amount of hardware to the system because the hardware must be designed for the maximum amount of installable memory and also for the minimum physical page size.

The problems noted above have prevented the wide spread use of dynamic page placement and there are almost no systems in existence which use this technique. A solution which would allow the counters to be placed within the memory controller while consuming less space and removing the constraint of containing enough counters for the maximum allowable memory and smallest page size is necessary before dynamic page placement becomes feasible in real-world computer architectures.

DISCLOSURE OF THE INVENTION

The present invention provides a cache of history counters, which holds the history for the memory pages with the potential to be dynamically relocated. This permits creating histories of memory accesses for the purpose of dynamic page placement.

The present invention further provides a system for dynamic page placement which requires fewer counters than one counter per processor for every page in memory.

The present invention further provides a dynamic page placement system in which the number of counters is independent of the amount of memory installed.

The present invention further provides a dynamic page placement system in which the number of counters is independent of the operating system memory page size.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
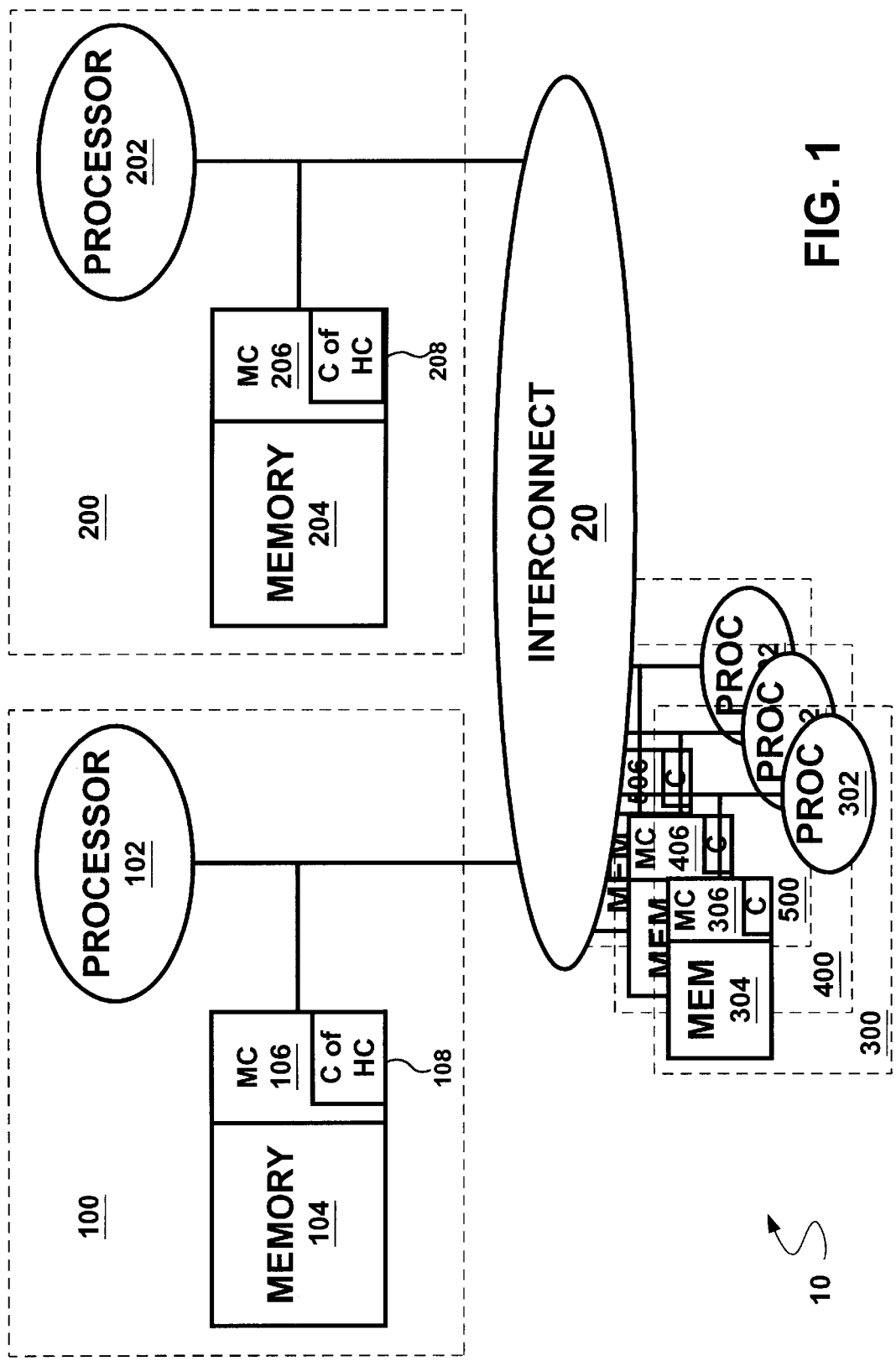
FIG. 1 is a computer system incorporating the cache of history counters of the present invention.

Referring now to FIG. 1, therein is shown a Distributed Shared Memory (DSM) multi-processor system 10, which is one example of a Non-Uniform Memory Architecture (NUMA) System which is a cache coherent system. The multi-processor system 10 has a plurality of uniform memory access (UMA) cells 100, 200, 300, 400, etc. Each of the UMA cells 100, 200, etc. contains one or more memories and within each UMA cell, all the memories within the cell can be accessed with the same access latency by any processor in the multi-processor system 10.

The UMA cells 100, 200, etc. are operatively connected to an interconnect 20, which represents the conventional, general interconnection network between the processors, such as direct connections, crossbar switches, etc.

The UMA cell 100 contains a processor 102 operatively connected to a memory 104 which includes a memory controller 106. Similarly, the UMA cell 200 contains a processor 202 operatively connected to a memory 204 which includes a memory controller 206. In the same way, the other UMA cells contain processors, memories, and memory controllers.

According to the present invention, caches of history counters (CofHC) 108, 208, 308, 408, etc. are used in the DSM multi-processor system 10 and respond directly to memory accesses, as will later be explained, without requiring additional information from a processor. The caches of history counters can be disposed in a number of different locations within the DSM multi-processor system 10 with varying trade-offs which would be obvious to those having ordinary skill in the art. Thus, the caches of history counters can have operative associations with self-contained hardware, the processors, the interconnect, the memory, the memory controllers, etc. In the best mode, the caches of history counters 108, 208, 308, 408, etc. are respectively located in the memory controllers 106, 206, 306, 406, etc. which are a part of the memories 104, 204, 304, 404, etc., respectively.

Figure 2:
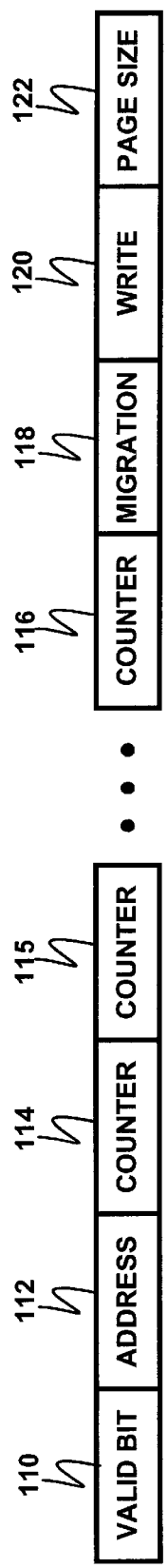
FIG. 2 shows the fields in the cache of history counters of the present invention.

Referring now to FIG. 2, therein is shown the register fields in the cache of history counters 108. Each entry of the cache of history counters 108 represents a portion of memory, such as one page in memory, that has the potential to increase system performance by migration or replication to other nodes.

First is the valid bit 110, which indicates whether an entry contains a valid address. For example, when a processor starts up, the cache will be empty and the fields will be meaningless. Even after executing many instructions, some of the cache entries may still be empty so it is necessary to know which entries can be ignored.

Next is the address field 112 which contains the page address. Following the address field 112 are the counter fields, one counter for every UMA cell which is incremented upon each memory access from an appropriate processor. The plurality of UMA cells 100, 200, 300, 400, etc. is represented by the first, second, and last counters 114, 115, and 116, respectively. In addition, migration counter 118 is incremented upon every migration of the page. A write counter 120 is incremented upon every write to the page. And, a page size field 122 may be needed if variable page sizes are used. The page size field can range from one bit or greater. Other fields can be added as required by the particular computer architecture.

Figure 3:
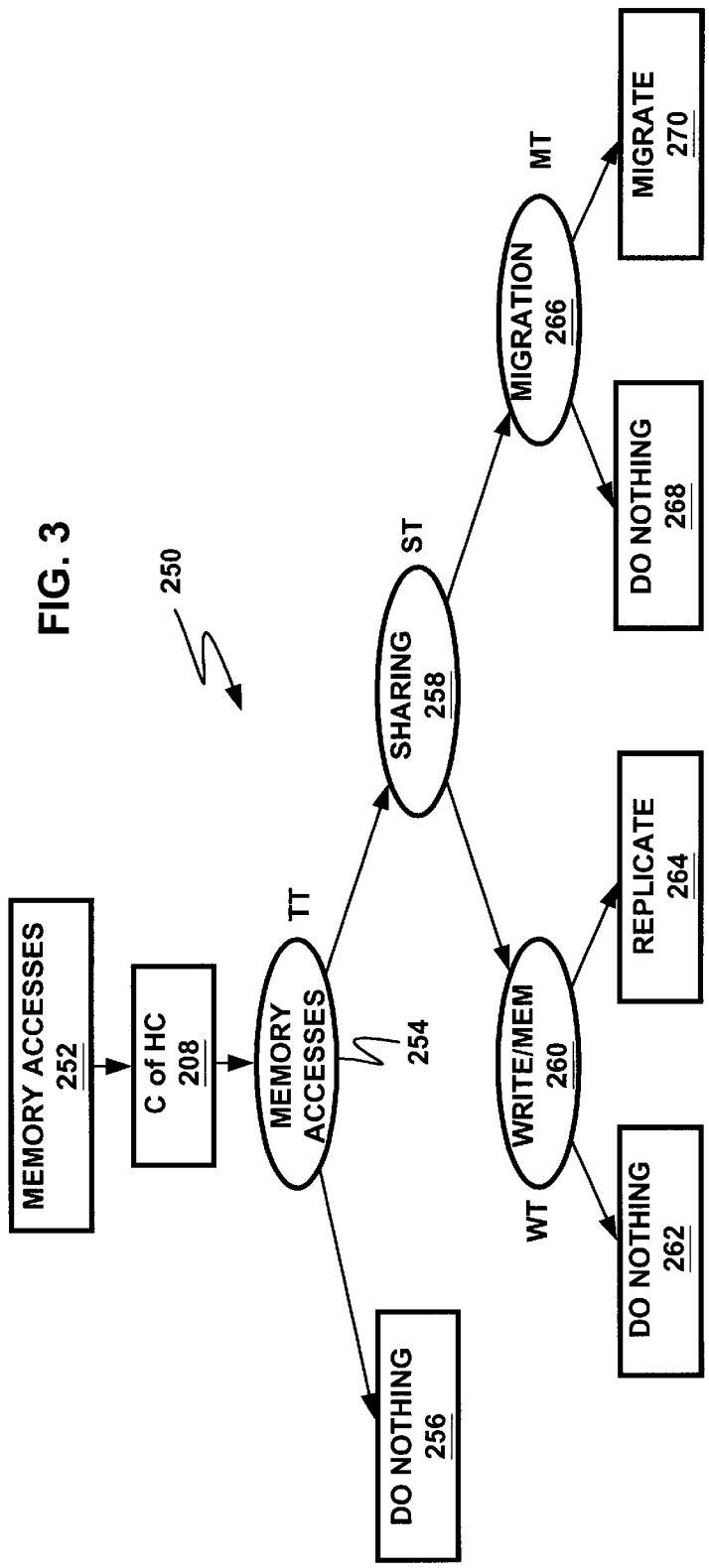
FIG. 3 shows the replication/migration decision tree used in the present invention.

Referring now to FIG. 3, therein is shown a replication/migration decision tree 250 used in the present invention for Dynamic Page Placement to decide if nothing should be done, if a page should be replicated, or if a page should be migrated to different memory locations. Dynamic Page Placement, as previously explained, will increase memory locality and therefore will reduce memory latency, reduce network traffic, and improve performance. The approach, described by Ben Verghese, et al, supra, is used in the present invention only for descriptive purposes and it should be understood that there are other approaches which could also be utilized. For example, the best mode utilizes the computer operating system (OS), but a dedicated hardware system could also be utilized.

The memory accesses to various pages in memory, as represented by memory access block 252, are provided to the cache of history counters, such as the cache of history counters 108. The CofHC provides a history of page memory accesses to a page decision block 254. The time intervals and values of the various thresholds are determined by those skilled in the art based on optimizing various operational parameters of the particular computer architecture and applications involved.

The operation of the decision block 254 is based on a Trigger Threshold (TT) which is a predetermined number of memory accesses after which migration/replication of a particular page is considered. If the memory accesses to the page are below the TT, the decision is made to do nothing as indicated by the do nothing block 256. If the memory accesses to the page are above the threshold, the tree branches to the sharing decision block 258.

The sharing decision block 258 operates based on a preset Sharing Threshold (ST) which is the number of memory accesses from another processor after which replication is considered. If the ST is exceeded, the decision tree branches to the write frequency and memory pressure decision block 260.

The write frequency and memory pressure decision block 260 operates on how often is the page accessed for writes and how much of the memory is being consumed by dynamic page placement. If there are a large number of local writes to the page or too much memory is being consumed by the dynamic page placement process, a Write Threshold (WT) will be exceeded after which there is no replication. If the write frequency or memory pressure is high, the decision tree branches to the do nothing block 262. If both are low, the decision is made to replicate the page under consideration as indicated by replicate block 264.

Referring back to the sharing decision block 258, if the Sharing Threshold is not exceeded, the decision tree branches to the migration rate decision block 266. The migration rate decision block 266 operates based on a Migrate Threshold (MT) which is the number of migrates after which a page should not be migrated. If the number of migrates exceeds the MT, the decision is to do nothing as indicated by the do nothing block 268. If the migration rate is low, the decision is to migrate, the page under consideration as indicated by migrate block 270.

In a multiprocessor system, it is also possible that both replication and migration may occur simultaneously based on memory accesses from a plurality of processors to multiple pages. Also a migrated page may later be replicated or migrated again due to changes in memory access patterns.

Figure 4:
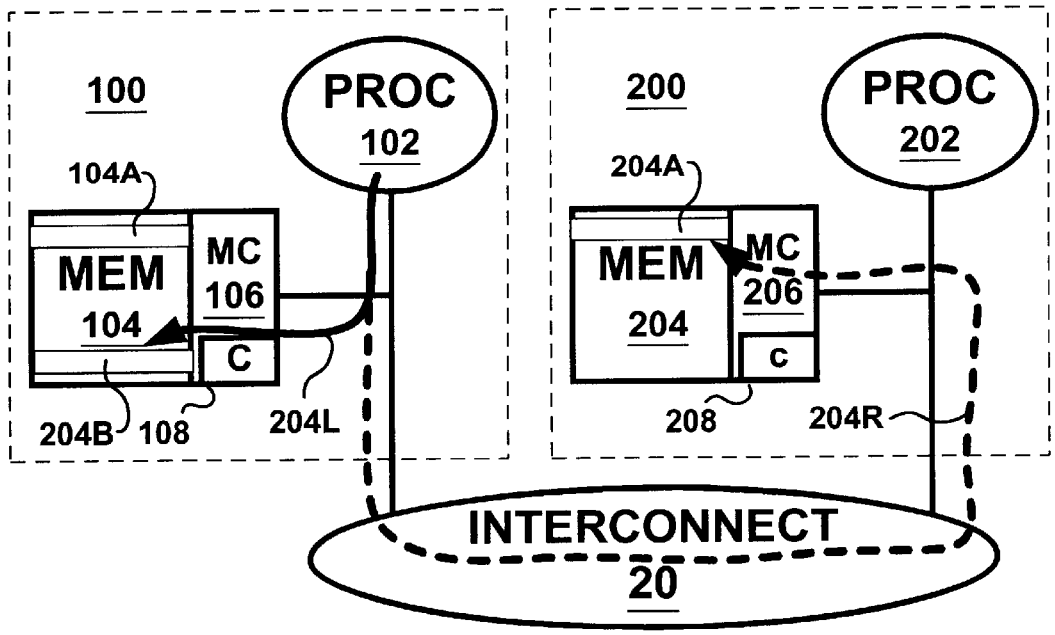
FIG. 4 shows an advantage of an access to a replicated page.

Referring now to FIG. 4, therein is shown the DSM multi-processor system 10 in which a remote memory access from the processor 102, as shown by an arrow 204L, accesses the replicated page 204B in memory 104. By comparison, a dashed arrow 204R shows how long a remote access would be to the original page 204A located at the home UMA cell 200 in memory 204. The same numbers in FIG. 4 designate the same elements as in FIG. 1.

Figure 5:
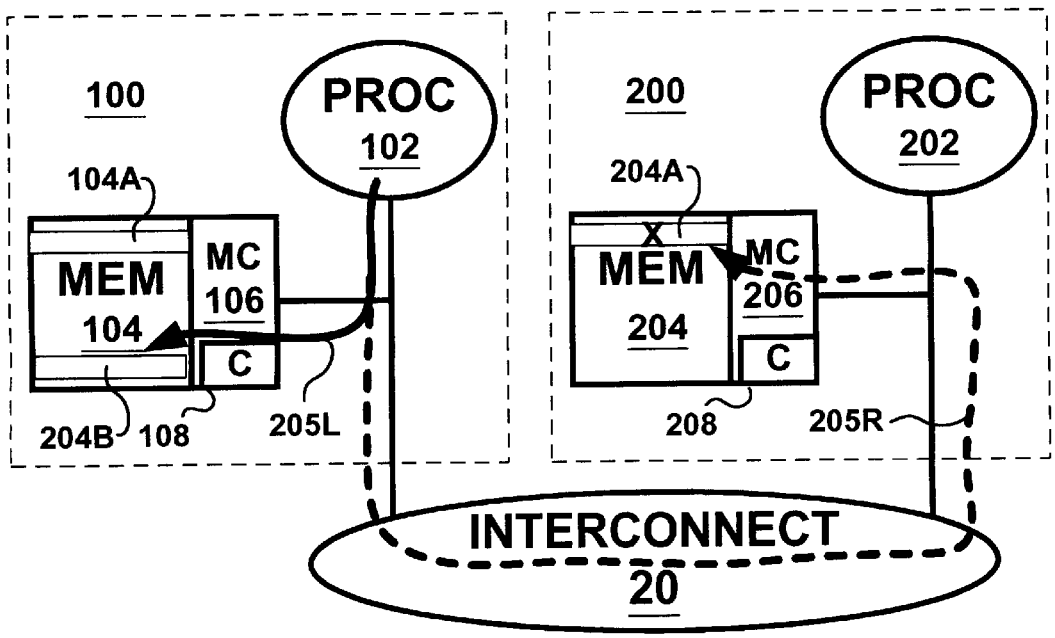
FIG. 5 shows access to a migrated page.

Referring now to FIG. 5, therein is shown access to a migrated page in which the processor 102 makes a local access, as shown by the arrow 205L, to the migrated page 204B in the memory 104. In FIG. 5, the remote access indicated by the dashed arrow 205R to the page 204A located at the home UMA cell 200 in memory 204 does not occur since the page has been migrated. The X on the page 204A in the memory 204 indicates that a migration has occurred and that the migrated page no longer exists in the memory 204.

In the DSM multi-processor system 10 of the present invention, there are multiple processors sharing memory pages and a finite sized memory local to each processor. This means that some percentage of the physical pages required by each processor will be located within remote physical memory. The chance that a physical page required by a processor is in local memory is determined by the method of physical page placement. There are a number of different static page placement techniques previously mentioned which initially locate each physical memory page in a memory in an attempt to obtain the highest percentage of memory accesses to be local.

After the initial static page placement, the DSM multi-processor system 10 uses the cache of history counters 108 in the memory controller 106 for providing the input information for dynamic page placement. Dynamic page placement is the migration and replication of memory pages to improve the percentage of local memory references. In the past, it has been implemented by using a group of counters for each memory page to keep track of how many accesses are made from each processor.

When a memory access is performed, the physical memory address is used to look up an entry in the cache of history counters for the memory location in parallel with the actual memory access. If a valid entry is found, then the counter of the accessing processor is incremented. If no entry is found, then a new entry is initialized and the appropriate counter is set to one. Thus, if the processor 202 is accessing the memory 104, it would simultaneously look up an entry in the cache of history counters 108. If an entry is found, then the counter 115 containing the memory access history for the accessing processor 202 is incremented. If no entry is found, then a new entry is initialized and the appropriate counter is set to 1. As would be understood by those skilled in the art, an alternative approach would be to initialize a new entry only if a remote processor is accessing the page. This way it is guaranteed that there are no entries allocated for pages accessed only by local processors.

If a new entry must replace an existing entry because of the predetermined, finite size of the cache, there are several replacement methods which can be used. One is to find an unused entry. A second is to replace the existing entry with the lowest rate of memory accesses. A third is to replace an existing entry using standard cache replacement policy, such as least recently used (LRU) or random replacement. This approach eliminates the need for a set of counters for every memory page.

In addition, a replaced entry can either be forgotten or put in a buffer to save in local memory so that the history of all the pages is maintained. The writing of local memory can be performed in the background so that the consumed bandwidth will not impact performance. This would provide the equivalent of a set of counters for every memory page.

Thus, when there is a memory access by a processor to a page, the page's counter is incremented in the appropriate entry in the appropriate cache of history counters. When these history counters reach the preset thresholds discussed in FIG. 3, the OS is made aware that there is a page in memory that has enough history counter data on how it is accessed for the OS to determine its optimal page placement. Once the optimal page placement has been determined, the page in memory can be migrated or replicated to a more optimal memory location.

As previously explained, a hardware structure can be used to perform the dynamic page placement process in place of the OS.

The number of counters 114 through 116 within each cache of history counters entry can be further reduced in situations where each memory has more than one processor local to it or a more course grained solution is acceptable or required. Similarly, if there are different levels of latency in the computer architecture, the cache of history counters and the dynamic page placement can be selectively used at those levels which most benefit the system.

While the invention has been described in conjunction with a specific mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A computer architecture comprising:

a local and a remote memory;

a remote processor operatively connected close to said remote memory and remote from said local memory to access said local and remote memories; and local means operatively associated with and operatively connected close to said local memory, said local means operatively connected to and remote from said remote processor for counting the accesses of predetermined portions of said local memory only by said remote processor whereby only accesses by said remote processor are used to determine dynamic placement of said predetermined portions of local memory.

2. The computer architecture as claimed in claim 1 including:

a local processor operatively connected close to said local memory and remote from said remote memory to access said local and said remote memories; and remote means operatively associated with and operatively connected to said remote memory, said remote means operatively connected to and remote from said local memory for counting only the accesses of predetermined portions of said remote memory by said local processor whereby only accesses by said local processor are used to determine dynamic placement of said predetermined portions of remote memory.

3. The computer architecture as claimed in claim 2 wherein:
said predetermined portions of said local and remote memories are pages of information; and
said local and remote caches of history counters provide access information for dynamic page placement of said pages of information.

4. The computer architecture as claimed in claim 3 including:
a system for replicating said pages of information in said local and remote memories under a first predetermined set of conditions and for migrating said pages of information between said local and remote memories under a second set of predetermined conditions.

5. The computer architecture as claimed in claim 1 wherein:
a local processor operatively connected close to said local memory and remote from said remote memory to access said local and said remote memories;
said local means contains a plurality of counters; and
said local means prevents counting of accesses by said local processor to portions of said predetermined portions of said local memory not represented by one of said plurality of counters contained therein.

6. The computer architecture as claimed in claim 1 wherein:
said local means is capable of containing a plurality of entries, each of said plurality of entries representative of a page in said memory.

7. The computer architecture as claimed in claim 1 wherein:
said local means is capable of containing a predetermined plurality of entries and a new entry in excess of said predetermined plurality of entries is capable of replacing one of said predetermined plurality of entries by a method selected from a group consisting of replacing an unused entry, replacing an entry having the lowest rate of accesses to memory, replacing an entry having the least recent use, and replacing a random entry.

8. The computer architecture as claimed in claim 1 wherein:
said local means is capable of containing a predetermined plurality of entries and an entry replaced by a new entry is stored in said local memory.

9. The computer architecture as claimed in claim 1 wherein:
said local means has a register therein only for remote accesses having fields consisting of a valid, address, counter, migration counter, write counter, page size, and a combination thereof.

10. The computer architecture as claimed in claim 1 wherein:
said local memory includes a memory controller operatively located therewith; and
said local means is operatively disposed in an element selected from a group consisting of said memory, said memory controller, said processor, said interconnect, and combinations thereof.

11. A computer architecture comprising:
a plurality of memories;
a plurality of processors operatively connected to access said plurality of memories;
each memory and processor of said plurality of processors and memories defining a plurality of uniform memory access cells;
said plurality of uniform memory access cells operatively connected to an interconnection network; and
a plurality of cache of history counters, each of said plurality of cache of history counters operatively associated with one of said plurality of uniform memory access cells and said interconnection network for tracking the accesses of predetermined portions of said plurality of memories only by said plurality of processors not in said uniform memory cell whereby only accesses from outside the uniform memory cell are used to determine dynamic placement of said predetermined portions of memory.

12. The computer architecture as claimed in claim 11 wherein:
each of said plurality of cache of history counters counts the memory accesses by each of said plurality of processors remote therefrom of predetermined portions of each of said plurality of memories local thereto.

13. The computer architecture as claimed in claim 12 wherein:
said predetermined portions of each of said plurality of memories are memory pages; and
said plurality of cache of history counters provide memory access information for dynamic page placement of said memory pages in said plurality of memories.

14. The computer architecture as claimed in claim 13 including:
an operating system using information from said local and remote cache of history counters for replicating said memory pages selected locations in said plurality of memories under a first predetermined set of conditions, modifying replicated memory pages under a second predetermined set of conditions, and for migrating said memory pages of information among said plurality of memories under a third set of predetermined conditions.

15. The computer architecture as claimed in claim 11 wherein:
one of said plurality of processors is a local processor operatively connected close to a local memory and remote from a remote memory to access said local and said remote memories;
one of said plurality of caches of history counters is a local cache of history counters containing a plurality of counters; and
said local cache of history counters prevents counting of accesses by said local processor to portions of said predetermined portions of said local memory.

16. The computer architecture as claimed in claim 11 wherein:
each of said plurality cache of history counters is capable of containing a plurality of entries, each of said plurality of entries representative of a memory page in said memory.

17. The computer architecture as claimed in claim 11 wherein:
each of said plurality cache of history counters is capable of containing a predetermined plurality of entries and a new entry in excess of said predetermined plurality of entries is capable of replacing one of said predetermined plurality of entries by a method selected from a group consisting of replacing an unused entry, replacing an entry having the lowest rate of accesses to memory, replacing an entry having the least recent use, and replacing a random entry.

18. The computer architecture as claimed in claim 11 wherein:

each of said plurality of cache of history counters is capable of containing a predetermined plurality of entries and an entry replaced by a new entry is stored in said memory local to said cache of history counters.

19. The computer architecture as claimed in claim 11 wherein:

each of said plurality of cache of history counters has a register therein having a field consisting of a valid bit, an address, a plurality of counters only for each of said plurality of processors remote therefrom accessing said each of said local memories, a migration counter, a write counter, a page size field, and a combination thereof.

20. The computer architecture as claimed in claim 11 wherein:

each of said plurality of memories includes a memory controller operatively located therewith; and said plurality of cache of history counters operatively disposed in elements selected from a group consisting of said memory, said memory controller, said processor, said interconnect, and combinations thereof.

21. The computer architecture as claimed in claim 1 wherein:

said predetermined portions of said local memory have individual identifications; and said local means contains individual entries for less than all of the individual identifications of said predetermined portions of local memory and only said individual entries of the most frequently accessed of said predetermined portions of local memory are maintained in said local means.

22. The computer architecture as claimed in claim 11 wherein: said predetermined portions of said plurality of memories have individual identifications; and each of said plurality of cache of history counters in each uniform memory access cell contains less than all of the individual identifications of said predetermined portions of memory in each uniform memory access cell and each of said plurality of cache memory counters contains individual entries for only said individual identifications of the most frequently accessed of said predetermined portions of memory from outside each uniform memory access cell for each of said plurality of cache of history counters.

* * * * *